Nov. 3, 1964    J. D. DAVIDSON ETAL    3,155,955
SHAFT POSITION INDICATOR

Filed May 15, 1961    3 Sheets-Sheet 1

WITNESSES
John C. Healy, Jr.
James T. Young

INVENTORS
John D. Davidson &
Franklin J. Murphy, Jr.
BY
ATTORNEY

United States Patent Office 3,155,955
Patented Nov. 3, 1964

3,155,955
SHAFT POSITION INDICATOR
John D. Davidson, North Huntingdon Township, Westmoreland County, and Franklin J. Murphy, Jr., Pittsburgh, Pa., assignors to Westinghouse Electric Corporation, East Pittsburgh, Pa., a corporation of Pennsylvania
Filed May 15, 1961, Ser. No. 110,092
4 Claims. (Cl. 340—268)

The present invention relates to means for indicating the rotational position of a shaft, and more particularly to means for indicating the relative rotational positions of two rotating shafts.

The invention provides a simple and reliable means for indicating the rotational position of a rotating shaft, or for indicating the relative positions or phase relation of two rotating shafts, and while its usefulness is obviously not restricted to any specific application it is especially useful for indicating synchronism of the shafts of a cross-compound turbine generator unit.

Cross-compound turbine generator units consist of two turbines each driving an electric generator, the most usual arrangement consisting of a high pressure turbine and a low pressure turbine, with steam exhausting from the high pressure turbine to the low pressure turbine, although other arrangements are possible and are sometimes used. The two generators are electrically connected in parallel and are operated as a unit. In starting such a cross-compound unit, it is necessary to initially rotate the shafts at a very low speed to insure uniform heating of the turbine rotors, and this is done by means of turning gear which consists of an electric motor for each turbine arranged to drive the shaft through a gear train and a clutch which disengages the turning gear when the shaft speed is increased. The two generators are usually synchronized with each other during this period of low speed operation, and after the generators have been synchronized, steam is admitted to the turbines and the unit is brought up to normal operating speed for connection to the line.

Synchronizing of the two generators of a cross-compound unit at low speed is accomplished by applying field excitation to the generator rotors, and if the rotors are sufficiently close to being in phase with each other, that is, if their rotational positions relative to their respective stators are sufficiently close to being the same for both machines, the two generators will pull into step and operate in synchronism. It is necessary, therefore, for the rotors to be in the proper rotational positions with respect to each other when field excitation is applied, as the generators will fail to pull into step if the rotors are too far from synchronism and one or both of the turning gears may disengage.

One method of attempting to synchronize cross-compound generators is to inch the rotors into phase with each other by alternate starting and stopping of one or both shafts which is difficult and time consuming. Another possible method is to start one shaft first and after it reaches the turning gear speed, the second shaft is started at a time such that when it reaches the same speed the two rotors will be in phase. This method involves the assumption that the time between starting the second rotor and the time it reaches the turning gear speed is always constant, which is not necessarily true. Another and preferable method of bringing the two rotors into phase involves rotating the two shafts at slightly different electrical speeds, so that the rotors will be in phase with each other at regular intervals and field excitation can be applied during these periods.

In all of these methods, however, as used heretofore, field excitation is applied manually and in a random manner since direct visual observation of the shafts to determine when they are in synchronism is usually not practical, and in many cases the machines are not visible at all from the operator's location. Thus, it has been necessary to apply field excitation in a random manner, and if the generators fail to pull into step, they must be restarted and another attempt made. These random methods of synchronizing cross-compound generators, therefore, frequently involve considerable delay before the field excitation is applied at the right point and also involve some risk of damage to the turning gear mechanism. Furthermore, this random application of field excitation is obviously not adaptable to automatic operation for which there is an increasing demand. Thus, some more positive and accurate means of synchronizing is needed and this requires a reliable means for indicating when the two shafts are in the proper phase relation with each other.

The principal object of the present invention, therefore, is to provide a simple and reliable means for obtaining a remote indication of the rotational position of a rotating shaft.

Another object of the invention is to provide means for obtaining a remote indication of the relative rotational position, or phase relation, of two rotating shafts.

A further object of the invention is to provide a synchronism indicator for indicating when the two shafts of a cross-compound turbine generator unit are in the proper phase relation to permit field excitation to be applied to synchronize the generators.

Other objects and advantages of the invention will be apparent from the following detailed description, taken in connection with the accompanying drawings, in which.

In general, the invention provides an indicating means or system in which the rotational position of a shaft is indicated by means of a stationary circular array of switch devices with actuating means rotating with the shaft to effect actuation of the switches successively as the shaft rotates. Each switch is connected to control an indicating lamp, or other suitable indicating means, so that the lamps light successively as the shaft rotates. The lamps are preferably arranged in a circle in positions corresponding to those of the switches, and for indicating the relative positions of two rotating shafts, the indicating lamps of the two shafts may be arranged in concentric circles so that as the lamps of each circle light successively, the positions of the lighted lamps indicate the relative rotational positions of the two shafts. In this way, a very reliable and effective indicating means is provided which permits accurate synchronizing of cross-compound turbine generator units by showing clearly when the two shafts are in the proper relative positions to permit field excitation to be applied.

Figure 1:
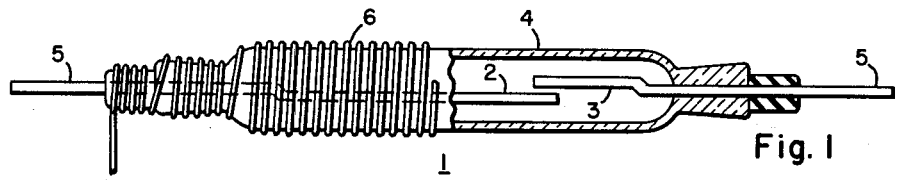
FIGURE 1 is a view, partly in elevation and partly in longitudinal section, of a switch device utilized in a preferred embodiment of the invention.

Referring now to the drawings, FIG. 1 shows a switch device 1 of the magnetic reed type which is suitable for use in this invention, although any type of switch having suitable characteristics might be used. As shown in FIG.

1, the switch 1 consists of two electrode members 2 and 3 which are sealed at their ends in a glass envelope 4, or other insulating enclosure, the ends of the electrodes 2 and 3 extending through the envelope to provide terminals 5. The electrode 2 is highly resilient and the electrodes are made of magnetic material, so that when an external magnetic field is applied, the electrodes move into contact to close the switch, and when the field is removed, the electrodes separate to open the circuit. Such switches are commercially available and are highly reliable and very fast in operation. In order to control the switch 1 and to hold it closed when desired, as described hereinafter, a coil or solenoid 6 is provided which may be wound directly on the glass envelope 4 of the switch. It will be seen that when the coil 6 is energized a magnetic field is provided which holds the switch in closed position.

Figure 2:
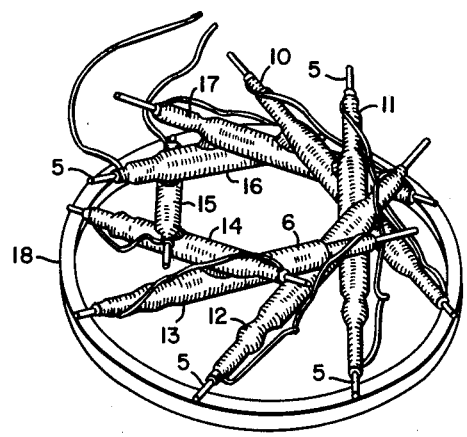
FIG. 2 is a perspective view of an assembly or array of switch devices.
Figure 3:
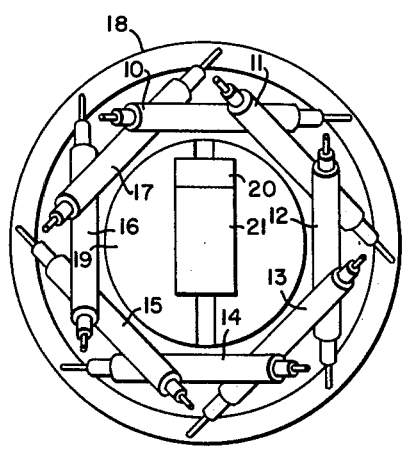
FIG. 3 is an end view of the array of switch devices and the actuating means for successively actuating the switches.

For the purposes of the present invention, a plurality of switches 1 is utilized, any suitable number being provided. In the preferred embodiment shown in the drawing, eight switches are used, designated 10 to 17 inclusive. As shown in FIG. 2, the eight switches are mounted in a circular array or assembly with one terminal 5 of each switch attached to a supporting ring 18 which is preferably a metal ring to serve as a common connection for one side of each switch. The switches are preferably angularly disposed and arranged in overlapping positions, as shown in FIGS. 2 and 3, to conserve space and provide a compact assembly. A lead (not shown) is brought out from each of the free terminals 5 of the switches, and the coils 6 of the eight switches are preferably connected in series although they might be connected together in parallel or any other desired manner for simultaneous energization.

As previously indicated, the switch devices 10 through 17 are successively actuated magnetically as the generator shaft with which they are associated rotates. For this purpose, as shown in FIG. 3, a shaft 19 is provided which is attached to or connected with the generator shaft in any suitable manner to rotate with the generator shaft at the same speed. A permanent magnet 20 of any suitable permanent magnet material is attached to the shaft 19 in any desired manner. As shown somewhat diagrammatically in FIG. 3, the magnet 20 may be held in place by a spacing block 21 clamped between two clamping elements which form part of the shaft 19.

It will be understood that the magnet 20 might be mounted in any suitable manner to rotate with the generator shaft in a position to successively actuate the switches 10 through 17. In the preferred embodiment shown in FIG. 3, the circular array of switches is positioned around the shaft 19 in position for the magnet 20 to actuate the switches one after the other as the shaft rotates. The switch assembly may be supported and protected in any suitable manner and may preferably be encapsulated or potted in a suitable resin. When the switches 10 through 17 are each connected to an indicating lamp, or other indicating means, the successive lighting of the lamps, or actuation of the indicating means, will indicate the rotation of the shaft and provide an accurate and reliable indication of the rotational position of the shaft 19 and thus of its associated generator shaft.

Figure 4:
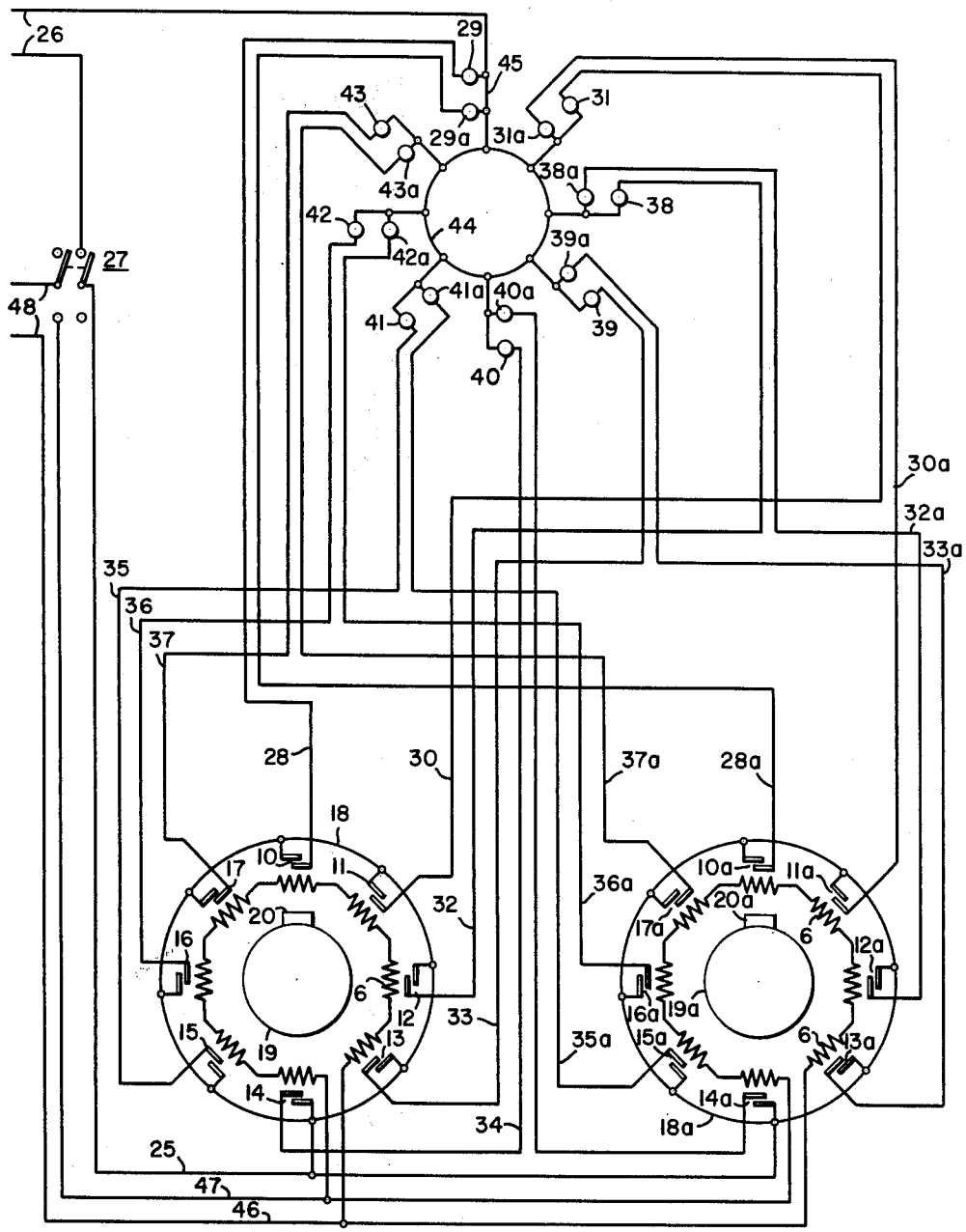
FIG. 4 is a circuit diagram showing the complete indicating system.

FIG. 4 shows the electrical connections of the complete indicating system. As indicated above, the shaft 19 is connected in any suitable manner to the generator shaft, or other shaft, the rotation of which is to be indicated. One side of each of the switches 10 through 17 is connected to a common connection 18, as mentioned above, which is connected through a lead 25 to one side of a low voltage supply 26 which may be either alternating current or direct current, a two-pole switch 27 preferably being connected as shown to control the circuit. The other side of each of the switches is connected to a suitable indicating device which is shown as a lamp. Thus, the switch 10 is connected by a lead 28 to an indicating lamp 29 and the switch 11 is similarly connected through a lead 30 to a lamp 31. Similarly, the switches 12, 13, 14, 15, 16 and 17 are connected through leads 32, 33, 34, 35, 36 and 37, respectively, to individual indicating lamps 38, 39, 40, 41, 42 and 43. The other side of each of the lamps is connected to a common connection 44 which is connected to the other side of the supply 26 by a lead 45. The indicating lamps are preferably arranged in a circle, as shown, in positions corresponding to those of the switches to which they are connected and it will be seen that as the shaft 19 rotates, the magnet 20 will actuate the switches successively so that the indicating lamps to which they are connected will light one after the other, and the apparent movement of the lighted lamp will follow the shaft rotation and indicate the rotational position of the shaft.

The magnetic reed type of switch shown in FIG. 1, which is preferably used, is very rapid in operation and is capable of long life with a large number of operations. In the particular application for which the invention is primarily intended, however, the indicating means is needed only when the generator is being started and the shaft is rotating at very low speed. It is undesirable to have the switches operating continuously for long periods of time when the machine is running at its much higher normal speed and the coils 6 are provided on the switches to prevent such operation. The coils 6 of all the switches are shown as being connected in series for simultaneous energization and they are connected by leads 46 and 47 to a direct current supply 48, preferably through the other side of the two-pole switch 27. The coils 6 are energized during normal operation of the machine and hold the switches in closed position to prevent the undesirable continuous opening and closing of the switches. Only a very low current is required for this purpose as the switches are quite sensitive and a relatively weak magnetic field is sufficient to hold them in closed position. The two-pole double-throw switch 27 is illustrated as a convenient means for simultaneously controlling the indicating lamps and the coils 6. When the switch is in the upper position, the system is operative with the coils 6 deenergized and the lamp circuits connected to the supply 26. When the switch 27 is in its lower position the lamp circuits are deenergized and the coils 6 are energized to make the switches inoperative.

The system as so far described may be used as a complete system to indicate the rotational position of a single shaft. The invention is particularly suitable, however, for use in the manner shown in FIG. 4 for indicating the relative positions of two shafts, such as the shafts of a cross-compound turbine generator unit. For this purpose, the shaft 19 is connected to the shaft of one generator and a similar indicating means is provided for the other generator. Thus, a second array of switches 10a to 17a inclusive is provided which may be identical to the assembly previously described, and a shaft 19a with a permanent magnet 20a is provided and connected to the shaft of the second generator to rotate therewith.

The switches 10a through 17a of the second generator are connected in the same manner as those previously described through a common connection 18a to the supply line 26. The other side of each of the switches 10a to 17a is connected to a corresponding indicating lamp. The indicating lamps for the second generator are designated 29a, 31a, 38a, 39a, 40a, 41a, 42a and 43a to correspond to the lamps of the first generator, and are connected to the respective switches in the same manner as the first assembly by correspondingly numbered leads. The two sets of indicating lamps are arranged in concentric circles, as shown on the drawing, and each lamp preferably corresponds in position to the switch with which it is connected. The two magnets 20 and 20a are oriented with respect to their respective generator rotors in such a manner that their positions correspond, so that when the two rotors have the same relative phase position the magnets will be in positions such that corresponding switches of the two assemblies will be closed and the indicating lamps in corresponding positions will light.

When both shafts are rotating, the lamps of each circle of indicating lamps will light one after the other in succession as the corresponding shaft rotates, and the two sets of indicating lamps will present to the observer two rotating spots of light, the relative positions of which are clearly visible. In synchronizing a cross-compound generator unit with this indicating means, the two generators are preferably operated on turning gear at slightly different speeds. Thus, for example, one generator may be rotated at a speed of 3.0 r.p.m. while the other generator may be rotated at a speed of 3.5 r.p.m. The rotor of the faster generator will thus overtake the rotor of the slower one and the two rotors will pass through synchronism at regular intervals. This can readily be observed by means of the successively lighting indicating lamps of the two sets which will give the appearance of two spots of light moving in concentric circles at the same two speeds as the shafts. The two shafts are in synchronism when the lighted lamps are in radial alignment and this point can readily be observed and field excitation applied to the generators at the correct time. In this way, the problem of synchronizing cross-compound turbine generator units is greatly facilitated, since the random operation which was previously necessary is eliminated and field excitation can be accurately applied at the proper time.

In many cases both generators of a cross-compound unit are identical and rotate at the same speed. The arrangement of FIG. 4 is suitable for such a unit and therefore uses the same number of switches for each machine. In other cases, however, the two generators have different numbers of poles, usually two poles and four poles, respectively, so that one generator rotates at half the speed of the other, the normal speeds being 3600 r.p.m. and 1800 r.p.m., respectively.

Figure 5:
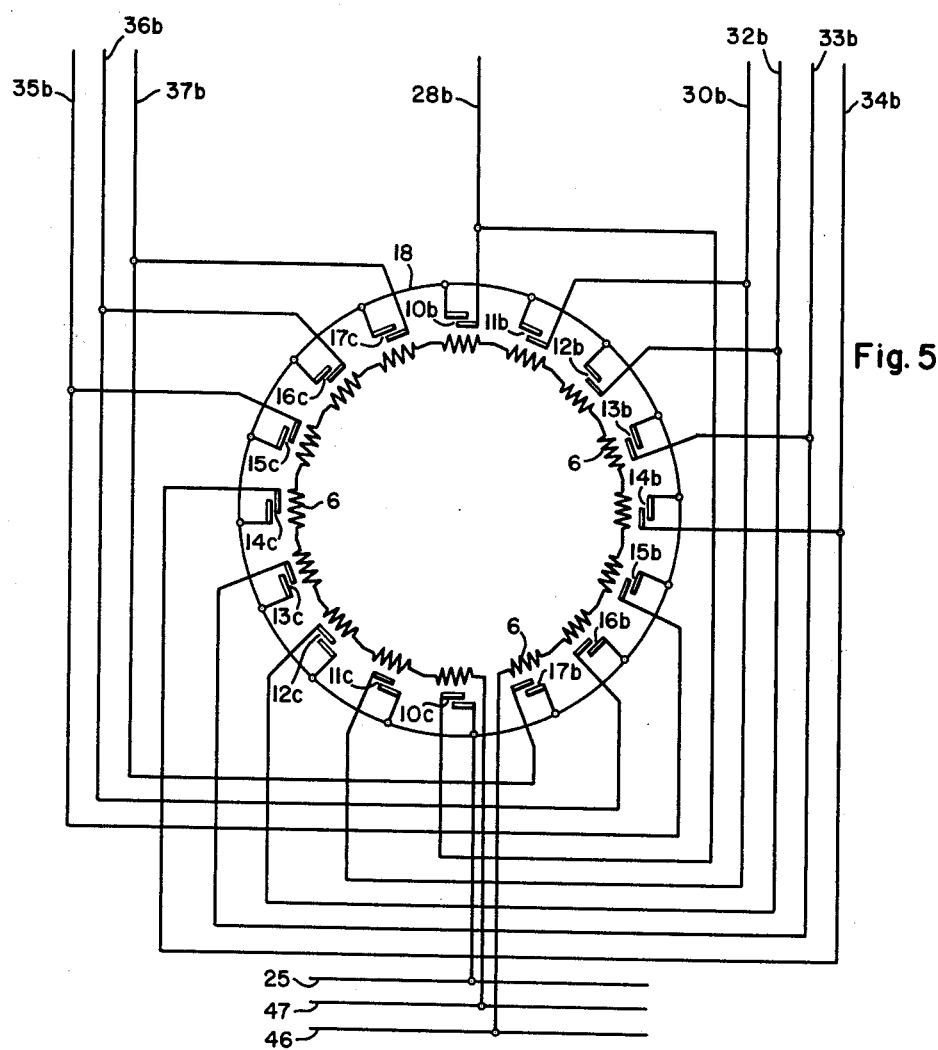
FIG. 5 is a partial circuit diagram which, in connection with FIG. 4, illustrates a modified embodiment of the invention.

The present invention is easily adaptable to such a unit, as shown in FIG. 5, which shows the switch assembly for the low speed shaft only, the high speed shaft switch assembly and the indicating lamps being the same as those shown in FIG. 4. Since in this arrangement the low speed generator has twice as many poles as the high speed generator and rotates at half the speed, there are two positions in each revolution of the low speed shaft where it is in synchronism with the high speed shaft. For this reason twice as many switches are provided for the low speed shaft as for the high speed shaft. As shown in FIG. 5, therefore, sixteen switches are utilized and diametrically opposite switches are connected together in parallel. The switches 10b to 17b correspond to switches 10a through 17a of FIG. 4 but extend over only half the circumference of the circular array, which corresponds to 360 electrical degrees of the four-pole generator. A second group of eight switches 10c through 17c is provided extending around the other half of the circular array. The switches of the second group are connected in parallel with the corresponding switches of the first group, diametrically opposite switches being connected together as shown. Each pair of opposite switches is connected to a single indicating lamp by leads 28b, 30b, etc., which correspond respectively to the leads 28a, 30a, etc., of FIG. 4.

As the low speed shaft rotates, each indicating lamp lights twice in each revolution, and since the shaft is rotating at half the speed of the high speed shaft, the lighted lamps of the two concentric circles of indicating lamps appear to rotate at the same speed and indicate the relative phase positions of the two rotors. The two rotors are preferably rotated at slightly different electrical speeds, as previously described, and the proper times for applying field excitation to synchronize the machines are clearly indicated.

It will be obvious that the invention is also adaptable to shaft speed ratios other than two to one, as long as the ratio of the shaft speeds is integral. In any such case, the low speed shaft will be provided with a number of switches equal to the number of switches of the high speed shaft multiplied by the speed ratio, and the switches of the low speed shaft will be connected in sets each consisting of an equally spaced number of switches equal to the speed ratio connected in parallel, so that each indicating lamp of the low speed shaft will light a number of times in each revolution equal to the ratio of the speeds of the two shafts, and the rotating light will thus appear to rotate at the same speed as that of the high speed shaft.

It should now be apparent that a simple and positive means has been provided for indicating the rotational position of a rotating shaft, and that this system is particularly suitable for indicating the phase relation of the rotors of a cross-compound turbine generator unit. This indicating means makes it possible to eliminate the random synchronizing method which was previously necessary, since it permits field excitation to be accurately applied to the generators at the correct time. The system provides a positive and easily observed indication by watching the apparent rotation of the lighted lamps in the two circles which is easily observable and permits very accurate operation. The system has the further advantage that it is readily adaptable to automatic control of synchronizing, since the successively operating switches provide unidirectional digital output signals which can easily be utilized to actuate automatic means for applying field excitation instead of, or in addition to, the indicating lamps. This is an important advantage because of the increasing demand for automatic operation.

It will be obvious that various other modifications may be made within the scope of the invention. Thus, instead of indicating lamps any other desired type of indicating means might be utilized, although for manual operation lamps are considered preferable because they are easily observed visually. It would also be possible to arrange the switches so that they would normally be closed and actuated to open position by the magnets. If this were done, the indicating lamps would all be lighted and one lamp in each circle would go out successively as the switches operated so that a dark spot in each circle of lamps would appear to rotate. Various other modifications and embodiments of the invention will also be obvious and are within the scope of the invention.

A preferred embodiment of the invention has been described in detail for the purpose of illustration, but it will be apparent that various other modifications and embodiments are possible and the invention is not limited to the specific arrangements and details of construction shown and described but includes all equivalent embodiments and modifications.

We claim as our invention:

1. Means for indicating the rotational position of a rotating shaft comprising a plurality of stationary switch devices disposed in a circular array, actuating means rotatable with the shaft and disposed in position to actuate said switch devices successively as the shaft rotates, individual indicating means connected to each of the switch devices for indicating the successive actuation of the switch devices, and means for preventing operation of the switch devices by said actuating means.

2. Means for indicating the rotational position of a rotating shaft comprising a plurality of stationary switch devices disposed in a circular array, said switch devices being of a type which is actuated by external magnetic force, magnet means rotatable with the shaft in position to actuate said switch devices successively as the shaft rotates, individual indicating means connected to each of the switch devices for indicating the successive actuation of the switch devices, a coil on each switch device, and means for energizing all of said coils to hold the switch devices in actuated position.

3. Means for indicating the relative rotational position of two rotating shafts comprising a first set of magnetically actuated switch devices disposed in a circular array, magnet means rotatable with one of the shafts in position to effect successive actuation of said switch devices, a second set of magnetically actuated switch devices disposed in a circular array, magnet means rotatable with the other of the shafts in position to effect successive actuation of the switch devices of the second set, a first set of indicating means individually connected to the switch devices of the first set of switch devices to be successively energized by actuation of the switch devices, a second set of indicating means individually connected to the switch devices of the second set of switch devices to be successively energized by actuation of the switch devices, the indicating means of each set being arranged in positions corresponding to those of the switch devices to which they are connected and the two sets of indicating means being disposed adjacent each other in such relative position that successive energization of the indicating means of the two sets indicates the relative rotational positions of the two shafts, and means for preventing operation of all the switch devices by said magnet means.

4. Means for indicating the relative rotational position of two rotating shafts comprising a first set of magnetically actuated switch devices disposed in a circular array, magnet means rotatable with one of the shafts in position to effect successive actuation of said switch devices, a second set of magnetically actuated switch devices disposed in a circular array, magnet means rotatable with the other of the shafts in position to effect successive actuation of the switch devices of the second set, a first set of indicating means individually connected to the switch devices of the first set of switch devices to be successively energized by actuation of the switch devices, a second set of indicating means individually connected to the switch devices of the second set of switch devices to be successively energized by actuation of the switch devices, the indicating means of the first set being arranged in a circle in positions corresponding to those of the switch devices to which they are connected, the indicating means of the second set being arranged in a circle concentric with the first-mentioned circle in positions corresponding to those of the switch devices to which they are connected, whereby successive energization of the indicating means of the two sets indicates the relative rotational positions of the two shafts, each of the switch devices having a coil thereon, and means for energizing all of said coils to prevent operation of the switch devices by said magnet means.

References Cited in the file of this patent

UNITED STATES PATENTS

| | | |
|---|---|---|
| 988,792 | Lertourne | Apr. 4, 1911 |
| 2,922,994 | Kennedy | Jan. 26, 1960 |
| 2,925,646 | Walsh | Feb. 23, 1960 |
| 2,943,307 | Sampson | June 28, 1960 |
| 2,999,914 | Stanaway | Sept. 12, 1961 |

FOREIGN PATENTS

| | | |
|---|---|---|
| 327 | England | Jan. 6, 1908 |